Patented Nov. 24, 1953

2,660,583

UNITED STATES PATENT OFFICE 2,660,583

PRODUCTION OF PYRROLINONES

Richard Norman Lacey, Hull, England, assignor to British Industrial Solvents Limited, London, England No Drawing. Application January 21, 1952, Serial No. 267,501

Claims priority, application Great Britain January 30, 1951

6 Claims. (Cl. 260—326.5)

The present invention relates to the production of pyrrolinones. In particular it refers to the production of 3-aceto-delta³-pyrrolin-4-ol-2-one and its derivatives substituted in the 1 and/or 5 positions. Throughout this specification and claims these compounds will be referred to generically as pyrrolinones.

Previous syntheses of compounds containing the same ring structure as the above pyrrolinones have required the reaction of ammonia or a primary amine on such starting materials as ethyl acetyl succinate or a beta-keto-gamma-halogenobutyric acid ester. It is an object of the present invention to provide a relatively simple synthesis of the pyrrolinones from easily accessible starting materials.

According to the present invention, the process for the production of a pyrrolinone comprises treating an acetoacetic acid amide, as hereinafter defined, with a substance which is known to be capable of bringing about the Claisen condensation whereby an alcohol group is eliminated. The acetoacetic acid amides, which may be converted into the corresponding pyrrolinones according to the process of the present invention, have the following structural formula:

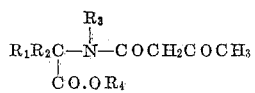

where $R_1R_2$ and $R_3$ represent aryl, aralkyl, alicyclic or lower alkyl groups or hydrogen atoms, and where $R_4$ represents a lower alkyl group.

The pyrrolinones have the following structural formula:

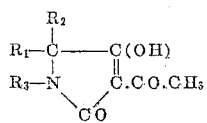

where $R_1$, $R_2$, and $R_3$ represent the same groups as before.

By lower alkyl group are meant the methyl, ethyl, propyl, butyl, amyl and hexyl groups. As examples of aryl groups there are mentioned the phenyl, methylphenyl, nitrophenyl, chlorophenyl and dimethylphenyl groups. By aralkyl group is meant a radical in which an aryl group is substituted for a hydrogen atom of a lower alkyl group, for example the benzyl and phenylethyl groups. As examples of alicyclic groups there are mentioned the cyclopropyl, cyclohexyl and methylcyclohexyl groups.

Examples of the compounds with the above mentioned formula, which may be converted into pyrrolinones according to the process of the present invention are the acetoacetic acid amides of the lower alkyl esters of alpha-amino carboxylic acids, such as glycine, alpha-alanine, valine, leucine, beta-phenyl alanine, tyrosine, alpha-aminophenylacetic acid, alpha-amino cyclohexyl acetic acid and their N-phenyl, N-methyl and N-cyclohexyl derivatives.

The cyclisation of the acetoacetic acid amide according to the process of the present invention to form the corresponding pyrrolinone by the elimination of the alcohol group ($R_4OH$) is brought about by the addition of a substance which is known to be capable of bringing about the Claisen condensation. Examples of such substances are metallic sodium or potassium, sodium or potassium alkoxides, triphenylmethyl sodium, sodium hydride and sodamide. By sodium or potassium alkoxides are meant the sodium or potassium salts derived from lower aliphatic alcohols, such as sodium or potassium methylate, ethylate, butylate and hexylate.

The quantity of the substance, which is known to be capable of bringing about the Claisen condensation, employed in the process of the present invention may be varied within wide limits, but it is preferred to use a quantity of substance approximately molecularly equivalent to the acetoacetic acid amide employed.

The formation of the pyrrolinones according to the process of the present invention may proceed comparatively slowly at low temperatures, for instance room temperature, and therefore it is preferred to carry out the process at an elevated temperature whereby the formation of the pyrrolinones is completed within a convenient period of time.

The reaction is most suitably carried out in the presence of an organic solvent, such as benzene, toluene or lower aliphatic alcohols or in mixtures of such solvents and when a solvent is employed in this way and it is desired to carry out the reaction at a controlled elevated temperature, it is preferred to carry out the reaction at the boiling point of the solvent which may be under reflux conditions. One embodiment of the present invention comprises dissolving the substance which is known to be capable of bringing about the Claisen condensation in a solvent and adding this to a solution of the acetoacetic acid amide in solution in the same or a different solvent.

The pyrrolinones so produced may be recovered from the reaction mixture by any known suitable means such as, for instance, a solvent extraction procedure. Many of the pyrrolinones which may be prepared according to the process of the present invention have useful medicinal properties.

The required acetoacetic acid amides may be prepared by the reaction of diketene on carboxylic esters which have an amine group or a monosubstituted amine group in the alpha-position to the carboxyl group. This reaction of diketene and alpha-amino carboxylic esters which has not previously been described proceeds very smoothly to give a good yield of the desired acetoacetic acid amide. The reaction is preferably carried out by the slow addition of diketene to the alpha-amino carboxylic ester which may be diluted with, or dissolved in, an inert organic solvent such as benzene, toluene or chloroform. Alternatively, the ester may be dissolved in an alcohol such as ethanol and in this case it is necessary to ensure, for instance, by cooling the solution throughout the addition of the diketene that the diketene reacts preferentially with the amino group and not with the solvent hydroxyl group.

It is often found that the alpha-amino carboxylic esters are most readily available as their hydrochloride salts and in this case it is first necessary to produce the free esters which can then be reacted with diketene to produce the desired acetoacetic acid amide. This conversion of the alpha-amino carboxylic ester hydrochloride to the free ester may be brought about by addition of a base to a solution of the ester hydrochloride, and it is a preferred embodiment of the present invention that the free ester is obtained in such a form that it may be reacted directly without isolation, with the diketene. For example, the alpha-amino carboxylic ester hydrochloride may be dissolved in an alcohol, for instance ethanol, and then reacted with the equivalent quantity of an alkali metal alkoxide, such as sodium ethoxide, which is obtained in solution by dissolving the alkali metal in the appropriate alcohol. In this way the free alpha-amino-carboxylic ester is produced in alcoholic solution together with the alkali metal chloride which is removed by filtration. Alternately, the free ester may be obtained by the addition of ammonia to a solution of the alpha-amino-carboxylic ester hydrochloride in chloroform, whereby the free ester is formed in chloroform solution, together with solid ammonium chloride which may be removed by filtration. The concentration of this solution under reduced pressure removes any excess ammonia and yields a chloroform solution of the alpha-amino-carboxylic ester which may then be reacted directly with the diketene as described above.

Most alpha-amino-carboxylic esters react readily with diketene at room temperature and in certain cases, as has been mentioned, the reaction may be cooled to avoid any side reactions of the diketene with the solvent employed. However, if the reaction proceeds very slowly at room temperature the reaction mixture may be heated to increase the reaction rate, and in these circumstances it is preferred to carry out the reaction in the presence of an inert diluent such as benzene, toluene or chloroform.

Suitable carboxylic esters have an amino group or mono-substituted amino-groups in the alpha-position to the carboxyl group and may be classified as primary or secondary amines with the following general formula:

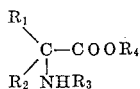

where $R_1$, $R_2$, $R_3$ and $R_4$ represent the same groups as hereinbefore defined.

The following examples illustrate specific methods for carrying the invention into effect. The expression "parts by weight" and "parts by volume" used hereafter bear the same relationship to each other as do grams and millilitres.

EXAMPLE 1

*Ethyl ester of acetoacetamidoacetic acid*

42 parts by weight of glycine ethyl ester hydrochloride were dissolved in 80 parts by volume of warm ethanol and treated with a solution of sodium ethoxide in ethanol, obtained by dissolving 6.9 parts by weight of sodium in 80 parts by volume of ethanol. The mixture was then agitated with rapid cooling and the sodium chloride so produced rapidly filtered off to give an ethanol solution of ethyl amino-acetate. This solution was treated with 26 parts by weight of diketene added over twenty minutes, the temperature being kept below 5° C. by cooling in an ice bath. After stirring for one hour at room temperature, the solvent was removed at reduced pressure and the solid residue was repeatedly extracted with ether to leave a little sodium chloride. Evaporation of the ether gave 49 parts by weight of white solid M. P. 45° C. (yield 87%), readily soluble in water, alcohol, ethyl acetate and insoluble in petroleum ether. Crystallisation proved difficult and the product was used without further purification: a small portion, however, was crystallised from ether in needles M. P. 49–50° C.

*3-aceto-delta³-pyrrolin-4-ol-2-one*

49 parts by weight of the crude ester prepared above in 100 parts by volume of benzene were refluxed with agitation with a solution of sodium methoxide obtained by dissolving 7 parts by weight of sodium in 80 parts by volume of methanol, and allowed to stand overnight. The mixture was then shaken with 100 parts by volume of water and the aqueous layer was run off. The solvent layer was then extracted twice with two 50 parts by volume portions of water. The aqueous extracts were then bulked and acidified with 16 parts by weight of concentrated sulphuric acid and repeatedly extracted with ether. After washing the ether extracts with brine they were dried over anhydrous sodium sulphate and evaporated to give 28.2 parts by weight of a residue, M. P. 148–150° C. (76% yield). Crystallisation from ethyl acetate or acetone-petroleum ether afforded pure 4 - hydroxy - 3 - aceto - delta³ - pyrrolin - 2-one, M. P. 155° C., as colourless microcrystals. The compound was soluble in acetone, moderately soluble in water, soluble in alkali, insoluble in acids. It afforded a red colouration with ferric chloride and dissolved in sodium bicarbonate with the liberation of carbon dioxide.

Its 2:4-dinitrophenylhydrazone formed dark red microcrystals, M. P. 229° C. (dec.) and its phenyl-hydrazone formed golden needles, M. P. 191–2° C.

The sodium methoxide used to bring about the conversion of the ethyl ester of acetoacetamidoacetic acid in this example may be replaced by an equivalent amount of potassium methoxide or other sodium or potassium alkoxides, triphenyl-methyl sodium, sodamide or sodium hydride and the experiment repeated substantially as described to give essentially the same result.

EXAMPLE 2

*Ethyl ester of alpha-acetoacetamido propionic acid*

PREPARATION (A)

25 parts by weight of alpha-alanine ethyl ester hydrochloride were dissolved in 50 parts by volume of warm ethanol and treated with a solution of 3.7 parts by weight of sodium in 50 parts by volume of ethanol. The product was rapidly cooled, filtered to remove precipitated sodium chloride and treated with 14.5 parts by weight of diketene which was added slowly to the solution over a period of one hour, the temperature not being allowed to exceed 10° C. After standing for 1 hour at room temperature the product was evaporated under reduced pressure to give 28 parts by weight of an oil.

PREPARATION (B)

20 parts by weight of alpha-alanine ethyl ester hydrochloride were stirred at room temperature with a solution of 2.4 parts by weight ammonia in 90 parts by volume of chloroform for 3 hours. The ammonium chloride precipitated was filtered off and the resultant solution was concentrated and freed from excess ammonia by evaporation under reduced pressure. 11.5 parts by weight of diketene were added to the agitated chloroform solution at room temperature over a period of half an hour, to yield after the removal of the solvent 24 parts by weight of an oil.

*3-aceto-5-methyl-delta³-pyrrolin-4-ol-2-one*

28 parts by weight of the ethyl ester of alpha-acetoacetamido propionic acid in 50 parts by volume of benzene were mixed with 3.75 parts by weight of sodium in 50 parts by weight of ethanol and the resultant mixture was refluxed with agitation for 3 hours and allowed to stand overnight. 150 parts by volume of water were added to dissolve the sodium salts and the benzene layer was then twice extracted with 25 parts by volume portions of water. The combined extracts were acidified with 8 parts by weight of concentrated sulphuric acid and concentrated under reduced pressure to a volume of about 100 parts by volume when some solid separated. Thorough extraction with ether gave, on removal of solvent, 11.5 parts by weight of product as a white solid. Crystallisation from ethyl acetate-petroleum ether gave needles, M. P. 115–6° C.

A 2:4-dinitrophenylhydrazine derivative was prepared and crystallised from aqueous acetic acid as red microcrystals, M. P. 223° C. (dec.).

The sodium ethoxide used to bring about the conversion of the ethyl ester of alpha-acetoamidopropionic acid in this example may be replaced by an equivalent amount of potassium ethoxide or other sodium or potassium alkoxides, triphenylmethyl sodium, sodamide or sodium hydride and the experiment repeated substantially as described to give essentially the same result.

EXAMPLE 3

*Ethyl ester of N-phenyl-acetoacetamido-acetic acid*

17.6 parts by weight of diketene were added dropwise to a boiling solution of 33.4 parts by weight of ethyl N-phenyl aminoacetate in 50 parts by volume of benzene during a period of half an hour. Removal of the solvent yielded the product as an oil.

*3-aceto-1-phenyl-delta³-pyrrolin-4-ol-2-one*

The ethyl ester of N-phenyl acetoacetamido-acetic acid, as obtained above, was refluxed for 5 hours in 100 parts by volume of benzene with a solution of sodium ethoxide obtained by dissolving 5 parts by weight of sodium in 50 parts by volume of ethanol. After standing overnight, the product was extracted with water and the aqueous extract acidified with 10.7 parts by weight of sulphuric acid in 50 parts by volume of water. The product was deposited as an orange precipitate which was recrystallised from ethanol to give 37 parts by weight of the pure pyrrolinone as fawn coloured plates, M. P. 148° C.

The phenyl hydrazine derivative formed buff-coloured plates, M. P. 198–9° C. The 2:4 dinitrophenyl-hydrazine derivative formed a red solid, M. P. 263° C. (dec.).

The sodium ethoxide used to bring about the conversion of the ethyl ester of N-phenyl-acetoacetamido-acetic acid in this example may be replaced by an equivalent amount of potassium ethoxide or other sodium or potassium alkoxides, tri-phenylmethyl sodium, sodamide or sodium hydride and the experiment repeated substantially as described to give essentially the same result.

I claim:

1. A process for the production of a pyrrolinone which comprises reacting an acetoacetic acid amide of the structural formula

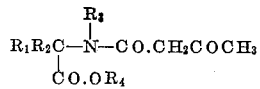

with a Claisen condensation agent whereby an alcohol group is eliminated, wherein said structural formula $R_1$, $R_2$ and $R_3$ are members of the group consisting of aryl, aralkyl, alicyclic and lower alkyl groups and hydrogen atoms and where $R_4$ represents a lower alkyl group.

2. A process according to claim 1, wherein said substance is selected from the group consisting of metallic sodium, metallic potassium, sodium alkoxide, potassium alkoxide, triphenylmethyl sodium, sodium hydride and sodamide.

3. A process according to claim 1, wherein the reaction mixture of the acetoacetic acid amide and Claisen condensation agent is heated.

4. A process according to claim 1, wherein the reaction is carried out in an organic solvent.

5. A process according to claim 4, wherein the reaction is carried out at the boiling point of the organic solvent.

6. A process according to claim 1, wherein the acetoacetic acid amide is prepared by the action of diketene on a carboxylic ester having an amine group in the alpha-position to the carboxyl group.

RICHARD NORMAN LACEY.

No references cited.